Feb. 1, 1927. 1,616,324
R. C. LIVINGSTON
PLOW
Filed Oct. 18, 1924
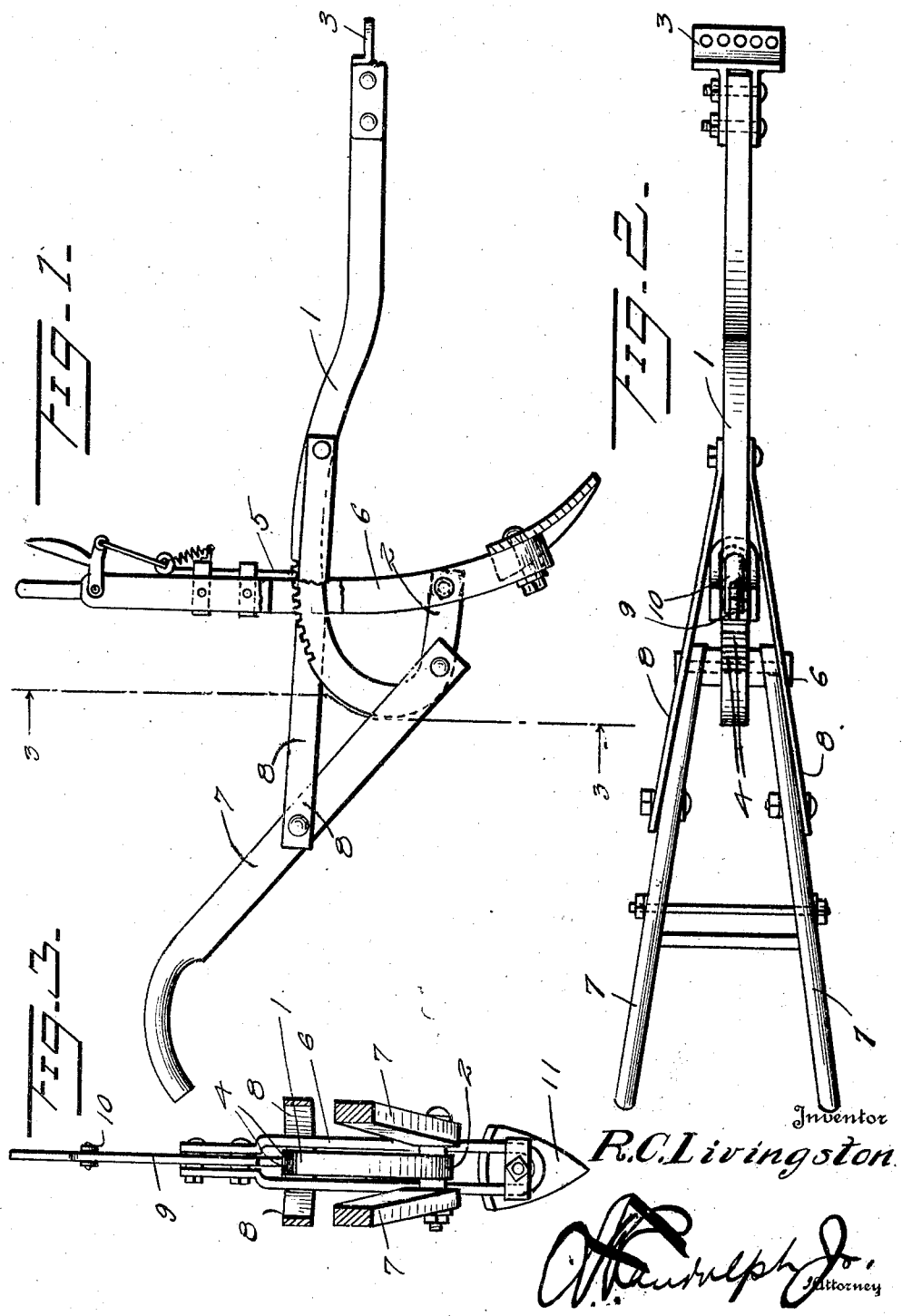
Inventor
R.C. Livingston
Attorney Patented Feb. 1, 1927.

1,616,324

UNITED STATES PATENT OFFICE.

RUEL C. LIVINGSTON, OF GLENWOOD, GEORGIA.

PLOW.

Application filed October 18, 1924. Serial No. 744,378.

This invention relates to a one horse plow designed chiefly for cultivating crops and which is adjustable to operate effectively on different kinds of soil and to run deep or shallow as required.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the nature of the invention.

Referring to the accompanying drawings forming a part of the specification,

Figure 1 is a side view of a plow embodying the invention, parts being broken away, Figure 2 is a top plan view, and Figure 3 a sectional view on the line 3—3 of Figure 2.

Corresponding and like parts are referred to in the following description and designated in the several views of the drawings by like reference characters.

The numeral 1 denotes the beam which is curved downwardly and forwardly at its rear end as indicated at 2 and which is provided at its front end with the usual clevis 3 for adjustable connection of the draft therewith. Notches 4 are provided upon the top side of the rear curved portion of the beam and enables a catch 5 to make positive engagement therewith whereby to hold a standard 6 in the required adjusted position. Handles 7 are pivotally connected to opposite sides of the lower end of the curved portion 2 and braces 8 adjustably connect the handles 7 with the beam 1 whereby the grips of the handles may be adjusted to suit the operator.

The standard 6 preferably consists of a bar folded upon itself and receiving the curved portion 2 of the beam between the spaced portions, the upper ends of the bar being clamped against opposite sides of a bar 9 which forms a handle, said bar having the catch 5 mounted thereon and provided with a latch 10 which is connected with the catch 5 whereby the latter may be conveniently operated as required to regulate the pitch of the shovel 11 to suit the nature of the soil and to enable the plow to operate deep or shallow as required, the standard 6 being held in the adjusted position by the catch 5 engaging one of the notches 4.

What is claimed is:—

A plow, comprising a beam consisting of a bar having its rear portion curved downwardly and forwardly, handles secured on opposite sides of the curved portion of the beam remote from the extremity thereof, braces connecting the handles with the beam forwardly of the downturned portion, a standard comprising a bar U-shaped in cross section and pivoted to the extremity of said curved portion and adapted to hold a plow share, the sides of said U-shaped bar extending upwardly and straddling the beam, a handle secured between the ends of said bar above the beam, a latch member carried by said handle, and the top side of the curved portion of the beam provided with notches to receive said latch and hold the standard in adjusted positions.

In testimony whereof I affix my signature.

RUEL C. LIVINGSTON.